(12) United States Patent
Olsommer et al.

(10) Patent No.: US 8,202,639 B2
(45) Date of Patent: Jun. 19, 2012

(54) FUEL CELL WITH INTEGRATED FLUID MANAGEMENT

(75) Inventors: David Olsommer, Le Mont Pélerin (CH); Daniel Laurent, Marly (CH); Cédric Leroy, Belmont (CH)

(73) Assignees: Michelin Recherche et Technique S.A., Granges-Paccot (CH); Paul Scherrer Institut, Villigen PSI (CH)

( * ) Notice: Subject to any disclaimer, the term of this patent is extended or adjusted under 35 U.S.C. 154(b) by 951 days.

(21) Appl. No.: 12/083,784

(22) PCT Filed: Oct. 16, 2006

(86) PCT No.: PCT/EP2006/009957
§ 371 (c)(1),
(2), (4) Date: Apr. 18, 2008

(87) PCT Pub. No.: WO2007/045416
PCT Pub. Date: Apr. 26, 2007

(65) Prior Publication Data
US 2010/0178576 A1 Jul. 15, 2010

(30) Foreign Application Priority Data
Oct. 18, 2005 (FR) ...................................... 05 10693

(51) Int. Cl.
*H01M 8/04* (2006.01)
(52) U.S. Cl. .......................................... 429/34; 429/434
(58) Field of Classification Search .................. 429/434, 429/34, 428, 433
See application file for complete search history.

(56) References Cited

U.S. PATENT DOCUMENTS

| | | | |
|---|---|---|---|
| 3,982,961 A | 9/1976 | Grasso | |
| 5,079,105 A | 1/1992 | Bossel | |
| 6,159,629 A | 12/2000 | Gibb et al. | |
| 6,338,472 B1 | 1/2002 | Shimazu et al. | |
| 6,855,442 B2 * | 2/2005 | Katagiri et al. | 429/434 |
| 6,926,985 B2 * | 8/2005 | Wariishi et al. | 429/434 |
| 6,974,646 B2 * | 12/2005 | Noetzel et al. | 429/425 |
| 7,226,688 B2 * | 6/2007 | Fujii et al. | 429/434 |
| 2003/0180603 A1 | 9/2003 | Richards | |
| 2004/0247984 A1 | 12/2004 | Ismaier et al. | |
| 2005/0053824 A1 | 3/2005 | Strobel et al. | |
| 2005/0079397 A1 | 4/2005 | Winkelmann et al. | |

FOREIGN PATENT DOCUMENTS

| | | |
|---|---|---|
| DE | 102 23 353 | 12/2003 |
| EP | 1 469 542 | 10/2004 |
| JP | 2001-143734 | 5/2001 |
| WO | WO 2004/015798 | 2/2004 |

* cited by examiner

*Primary Examiner* — Hien Vu
(74) *Attorney, Agent, or Firm* — Cozen O'Connor

(57) ABSTRACT

A fuel cell (FC) comprising a stack (A) of bipolar plates and ion exchange membranes arranged alternately, the stack (A) being clamped between two endplates (B and C), the stack (A) comprising feed and return ducts for the fluids required for the operation of the cell, said fluids comprising at least one fuel gas, the ducts communicating with a fluid management system comprising elements for controlling certain operating parameters, elements for recycling gases not consumed by the cell and elements for eliminating the water produced by the cell, said installation comprising connections for feeding gases to the cell, in which the fluid management system is at least partly integrated inside one of the endplates.

26 Claims, 15 Drawing Sheets

FUEL CELL WITH INTEGRATED FLUID MANAGEMENT

RELATED APPLICATIONS

This is a U.S. National Phase Application under 35 USC 371 of International Application PCT/EP2006/009957, filed on Oct. 16, 2006.

This application claims the priority of French patent application no. 05/10693 filed Oct. 18, 2005, the subject matter of which is hereby incorporated by reference.

FIELD OF THE INVENTION

The present invention relates to fuel cells. More particularly, it relates to the gas and coolant feed circuits of a fuel cell.

BACKGROUND OF THE INVENTION

It is known that the fuel cell has to be fed with hydrogen and air or pure oxygen. Generally, it must be cooled given the power densities sought; to this end, preferably, the cell is passed through by a coolant such as water. Furthermore, certain important gas management parameters must be controlled, such as gas pressure, gas temperature, gas humidity, gas recirculation rate. This requires a fairly complex and bulky gas management system, generally as bulky as the cell itself.

A fuel cell comprises a stack of bipolar plates and ion exchange membranes arranged alternately. The stack is clamped between two endplates. The fluid feed and return ducts are generally arranged parallel to the stacking direction and terminate at the endplates or at one of them, where they join ducts connecting the stack to said gas management system.

Integrating in one of the so-called endplates elements of the system for managing the fluids used by the cell is also known from US patent application 2004/0247984. However, according to the technology described, the elements for managing the fluids used by the cell are divided between a number of plates which are arranged in the direction of stacking, which leads to a substantial increase in the bulk of the cell in the stacking direction.

SUMMARY OF THE INVENTION

One aim of the invention is to reduce the bulk of said fluid management system, in order to facilitate its installation, for example, in a vehicle.

Another aim of the invention is to devise a simple fluid management system, the industrial production of which lends itself well to automation in order, among other advantages, to reduce the industrial production costs.

To make the fuel cell perfectly leakproof and confer uniformly distributed electrical conduction upon it, the stack is compressed by tie-rods parallel to the stacking direction and anchored on either side on the endplates. The latter must therefore be robust and exert sufficient and preferably uniform pressure over the entire cross-section of the bipolar plates and ion exchange membranes. The endplates must also withstand the pressure of the gases present in the system.

One aspect of the invention is directed to an endplate for a fuel cell, the endplate comprising a structural block having an internal face designed to bear against a stack of individual cells, with an external face opposite to the internal face and one or more peripheral faces, the internal face having at least two orifices designed to feed a gas circuit located inside the cell, the structural block comprising a first chamber and comprising a feed duct ending at a wall of the chamber, characterized in that:

the first chamber is provided between the internal face and the external face, and is delimited on the side of the internal face and of the external face by a wall of the structural block, the chamber being elongated roughly parallel to the internal face, the chamber opens onto a peripheral face, the chamber being delimited by at least one plug mounted on said peripheral face;

a recirculation body is fitted inside the chamber, positioned at the point where the feed duct ends, the recirculation body being mounted hermetically on the wall of the chamber to separate the chamber into a gas recirculation part terminating at one of the orifices and a feed part terminating at the other orifice, the recirculation body comprising a mixing element for mixing the new gas originating from the feed duct and the gas originating from the recirculation part and enabling the mixture to be directed to the other orifice.

Thanks to the invention, it is possible to integrate in said endplates, preferably in one of the two, a fluid management function by accommodating some of the elements necessary for the fluid management, preferably all the elements actively involved in the management of all the fluids. This is done by increasing the thickness of such an endplate, which can be prejudicial to the mechanical function of the endplate or plates, while enabling a simple machining of the endplate and a simple and robust assembly of various elements inside the latter.

This solution offers substantial advantages in terms of volume, weight saving, reliability and even manufacturing costs. Furthermore, it enables an interface to be created easily between the fuel cell and the vehicle in which it is installed using self-sealing couplings for the fluids, and plug-in electrical connectors. Advantageously, the electrical connectors and the couplings can be arranged so that the cell, in which the fluid management system is integrated, can easily be installed in and removed from the vehicle in order to facilitate the servicing, repair or replacement of the fuel cell.

It is in particular thanks to the creation of an elongated chamber and the fitting of a recirculation body inside the chamber, hermetically on the wall of the chamber, that the chamber can be separated into a gas feed part terminating at one of the orifices and a gas recirculation part terminating at the other orifice. Thus, numerous elements can be incorporated on an endplate, such as, for example, those elements used to control certain operating parameters. These can be, for example, pumps or solenoid valves for regulating the pressure of a gas. Also, these elements can be fitted on a series production line, the number of external pipes being reduced to a minimum.

It is especially advantageous to fit in or integrate on one of the endplates elements for recycling the gases not consumed by the cell. These are, for example, a Venturi-effect device making it possible, by means of a new gas flow, to suck up the gas leaving the cell and recirculate it in the latter. Preferably, elements for eliminating the water produced by the cell are fitted on or integrated in one of the endplates.

The elements mentioned above form part of a system for managing one of the gases. It is possible to associate the elements for managing one of the gases with one of the endplates and those for managing the other gas with the other endplate, or all these elements can be associated with only one endplate as in the example illustrating the invention and described in detail below. It is even possible to associate with one and the same endplate not only the gas management elements but also, and very advantageously, the elements for managing a coolant. Of course, the fluid management elements can be divided between the two endplates. The gas management elements and the coolant management elements can also be divided between the two endplates.

As will be shown in the example below, all the elements of the management system for all the fluids, both gas and coolant, can be mounted on or integrated in the endplates, or even in only one of them. Of course, it is already very advantageous to integrate in or mount on one or both endplates only some, preferably most, of the elements of the fluid management system.

Such a plate can be called a "system plate". Such an endplate is thus configured for a gas circuit. Of course, the invention also extends to an endplate configured to include the management elements for both gases (hydrogen and oxygen, for example), that is, a plate with two configurations similar to that described above.

According to another aspect of the invention, the latter also extends to an endplate configured to manage the coolant used to cool a fuel cell. Such an endplate for fuel cell, comprising a structural block having an internal face designed to bear against said stack, the internal face comprising at least two orifices designed to be linked to a coolant circuit located inside the cell, is characterized in that the structural block comprises a chamber forming a feeder of coolant, enabling the following arrangement:

the feeder-forming chamber is delimited by one or more walls of the structural block;
the feeder-forming chamber extends between said two orifices;
an insert is positioned and fitted inside the feeder-forming chamber, hermetically against the wall of the chamber, and comprises means to enable the circulation of the coolant selectively to said orifices.

Another aspect of the invention is directed to a fuel cell comprising a stack of bipolar plates and ion exchange membranes arranged alternately, the stack being clamped between two endplates, one of the endplates being a system plate.

BRIEF DESCRIPTION OF THE DRAWINGS

A detailed description of an embodiment and of a few variants of the invention are described below and illustrated with the appended figures in which.

DETAILED DESCRIPTION OF THE DRAWINGS

Before beginning the detailed description, the reader's attention is drawn to a notation convention for the figure indexes. Indexes beginning with the letter "P" denote a perforation, a duct, a cylindrical bore, a hole or an orifice in an endplate. Consider the example of an orifice through which a fluid enters a fuel cell. This is denoted "P7" in a generic way, that is, regardless of the fluid concerned. The index ends with the letter "o" to indicate more specifically the gas, oxygen or air, the letter "h" to indicate more specifically hydrogen gas and the letter "w" to indicate more specifically the coolant. Indexes beginning with the letter "A" refer to the stack of individual cells forming the fuel cell (commonly referred to as "stack"). Indexes beginning with the letter "C" denote a connector, whether electrical or for gas or coolant. Indexes beginning with the letter "E" denote an element belonging to the management system for one of the fluids. If an index beginning with "E" does not end with one of the letters "h",z "o" or "w", this means that the element concerned is unique, that is, it is not dedicated to only one of the fluids used.

Figure 1:
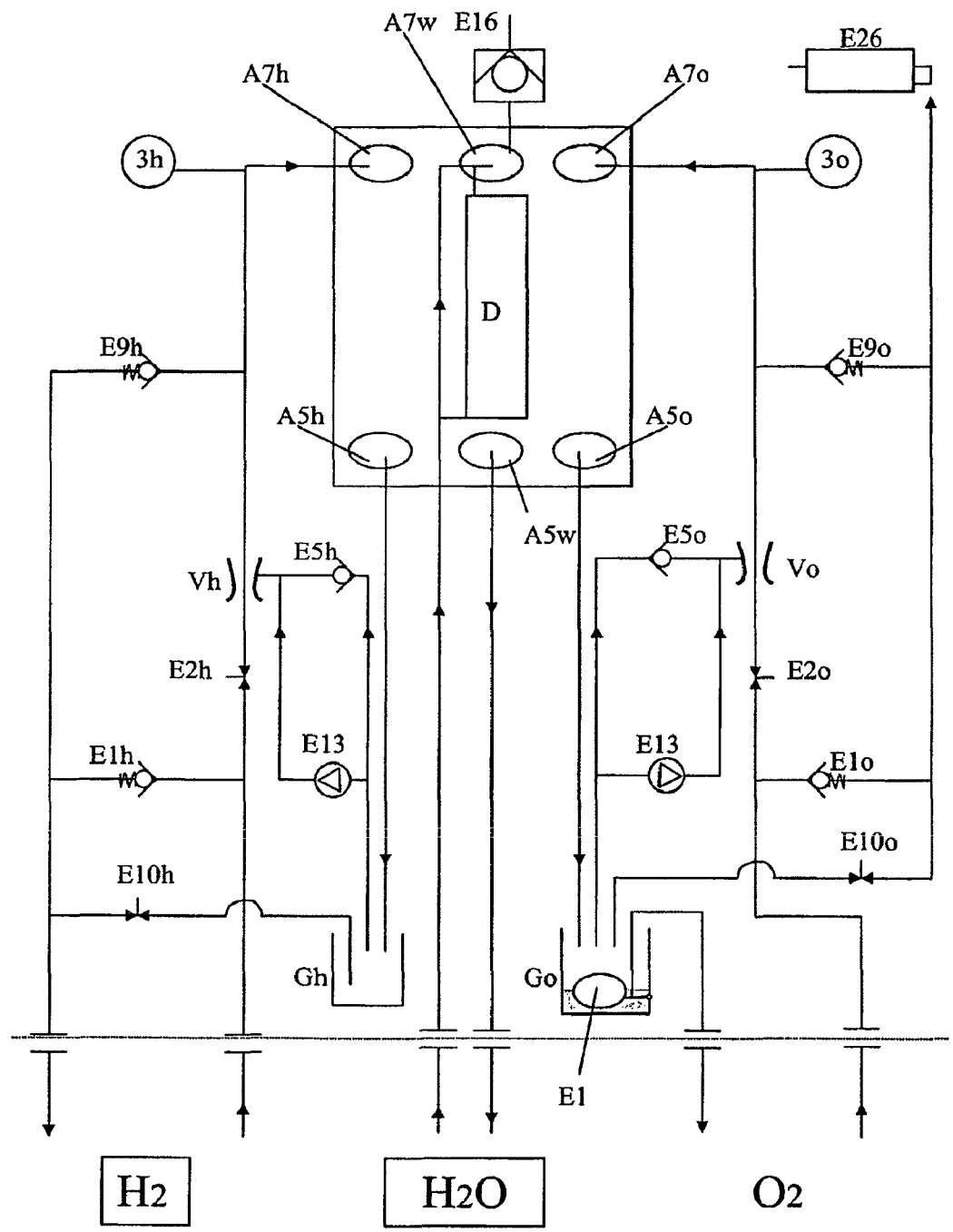
FIG. 1 is a schematic diagram of a system comprising a fuel cell and the associated gas management system.

In the schematic diagram of FIG. 1, a fuel cell FC is shown, which comprises a stack A of individual cells in which can be seen an inlet orifice A7h and an outlet orifice A5h of a hydrogen circuit, an inlet orifice A7w and an outlet orifice A5w of a circuit for water used as coolant, and an inlet orifice A7o and an outlet orifice A5o of an oxygen circuit. At the bottom of the figure can be seen all the gas and water connections, represented diagrammatically around a dotted line.

The operation of a fuel cell will not be described, since this is assumed to be known by the reader. In this description, the expression "fuel cell" denotes a system comprising a stack of individual electrochemical cells and the associated fluid management elements. It should also be stated that the example described here relates to a fuel cell fed with pure oxygen. In the case of a fuel cell fed with compressed ambient air, the air management circuit, compared to the oxygen management circuit, would include some adaptations entirely compatible with the integrated design proposed by the invention. For example, the air compressor might or might not be integrated, as might the means for controlling air humidity.

The description below aims to show a topology that enables the management elements for the fluids used by a fuel cell to be integrated in an endplate. The functional elements of the hydrogen circuit management system are as follows (see FIG. 1): a condenser Gh, a Venturi device Vh, a one-way valve E5h, an electric pressure regulator E2h, a pump E8h, a pressure sensor E3h, a feed pressure relief valve E1h, a pressure relief valve E9h in the fuel cell and a purging solenoid valve E10h. The elements of the water circuit management system are as follows: a deionizer D and an automatic purge valve E16. The elements of the oxygen circuit management system are as follows: a condenser Go, a Venturi device Vo, a one-way valve E5o, an electric pressure regulator E2o, a pump E8o, a pressure sensor E3o, a feed pressure relief valve E1o, a pressure relief valve Ego in the fuel cell, a purging solenoid valve E10o and a float E17 for regulating the level of water produced by the operation of the fuel cell.

Figure 2:
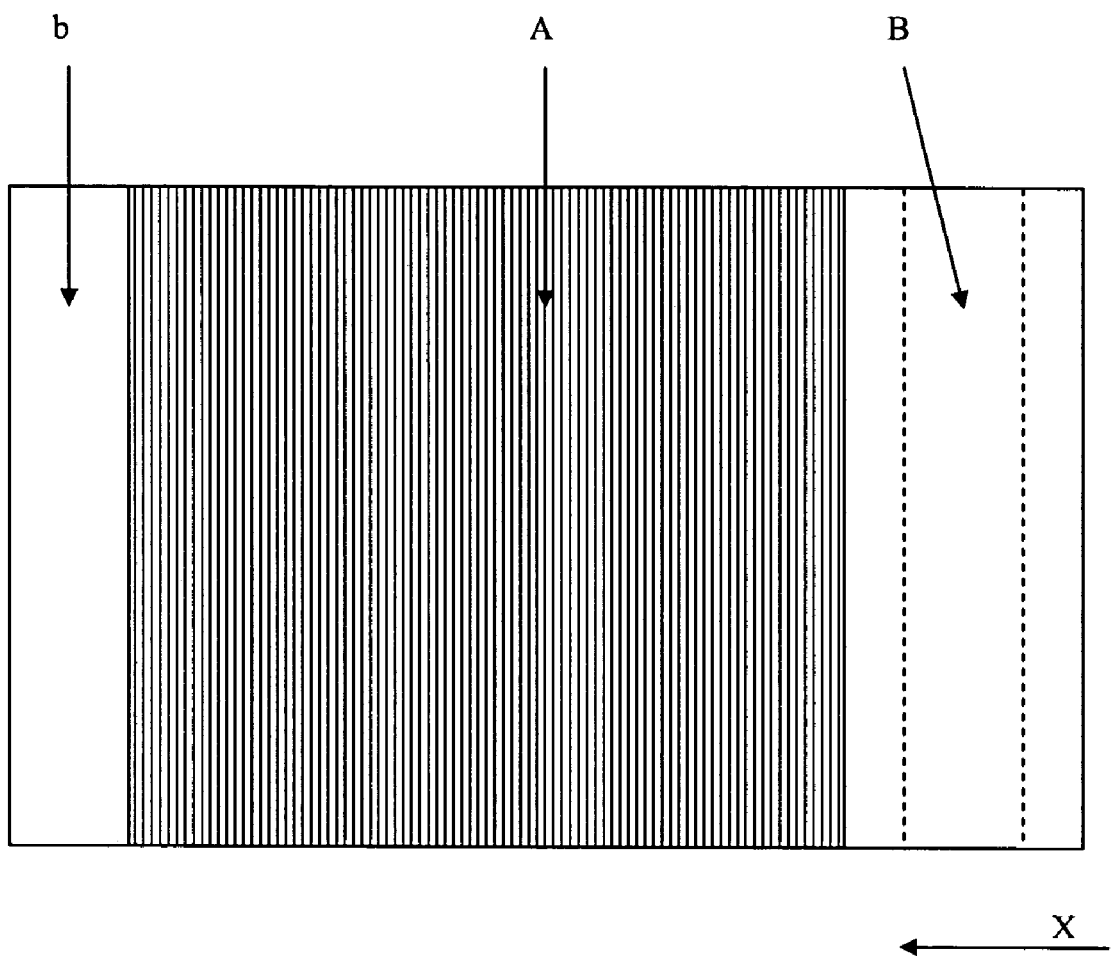
FIG. 2 is a diagrammatic side view of a fuel cell.
Figure 3:
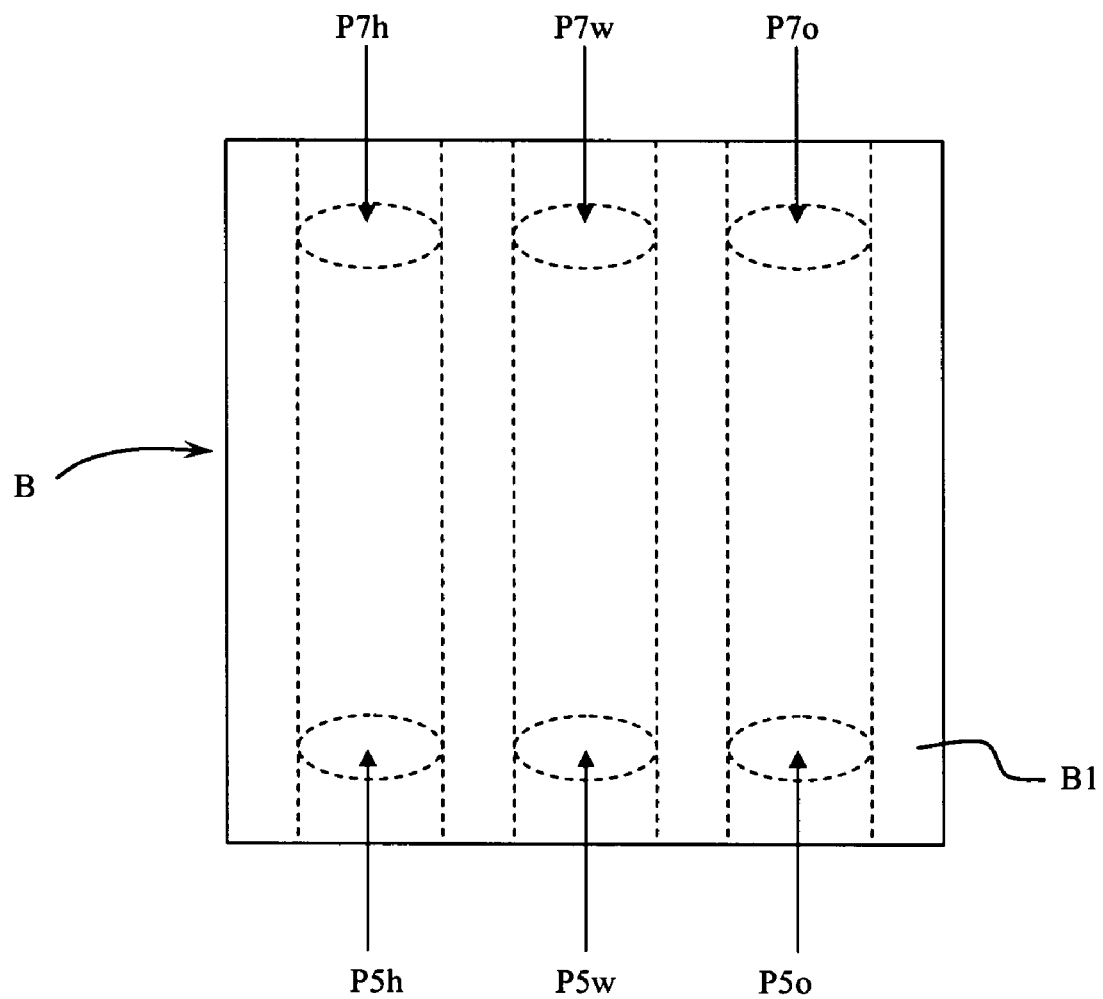
FIG. 3 is a view of the fuel cell from the direction X in FIG. 2.

FIG. 2 shows the stack A of individual cells that form the fuel cell. Remember simply that the individual cells of the stack A each comprise an anode and a cathode separated by an ion exchange membrane, the whole forming the electrode and membrane assembly known by the abbreviation "MEA" (Membrane Electrode Assembly). This stack is clamped between two endplates B and b. The clamping ensures the seal-tightness of the system, and good electrical contact between the elements. FIG. 3 shows the endplate B with the feed orifices P7h, P7w and P7o and recirculation orifices P5h, P5w and P5o of the gas and water circuits arranged inside the very fuel cell. The feed orifice P7h of the hydrogen circuit is fitted to the inlet orifice A7h (see FIG. 1) through which hydrogen enters the cell stack A; the recirculation orifice P5h of the hydrogen circuit is fitted to the outlet orifice A5h for unconsumed hydrogen leaving the stack A of individual cells; the feed orifice P7w of the cooling water circuit is fitted to the inlet orifice A7w through which water enters the stack A of individual cells; the recirculation orifice P5w of the water circuit is fitted to the outlet orifice A5w through which water leaves the stack A of individual cells; finally, the feed orifice P7o of the oxygen circuit is fitted to the inlet orifice A7o through which oxygen enters the stack A of individual cells and the recirculation orifice P5o of the oxygen circuit is fitted to the outlet orifice A5o through which unconsumed oxygen leaves the cell stack A.

According to the invention, the gas and cooling water management system is contained in the endplate B. The endplate B comprises a structural block B1 thick enough to accommodate three main chambers P1w, P1h and P1o, which can be seen in particular in FIGS. 4 and 7C. Advantageously, a chamber P1 is arranged essentially parallel to the internal face B10. Preferably, it is substantially straight and more preferably still, of cylindrical shape. FIGS. 7A, 7B, 7C and 7D provide a clear understanding of a non-limiting embodiment of the present invention. It is possible to start from a substantially parallelepipedal block of material and proceed by machining. FIGS. 7A, 7B, 7C and 7D show the appearance of the endplate B when the required perforations have been made, and before the elements needed to form the fluid management systems have been fitted. It can clearly be seen that the design of the integration lends itself well to production by successive sequences, combining all the operations of the same type in one and the same sequence.

To avoid confusing the rest of the description with unnecessary details, all of the machining and assembly operations involved in producing a functional system plate will not be described. The aim is to explain the design principle of integrating one or more management systems in an endplate, and the precise details, which in any case depend on the precise layout of the fluid management system or systems, can of course vary. It is possible to start from a drawn block already comprising all the perforations parallel to the direction in which the constituent material, for example aluminium, has been drawn. A block could also be made by casting.

Thus, preferably, all the feed and return ducts P2, P3 are provided between the internal face B10 and the external face B11, are elongated roughly parallel to the internal face B10, and terminate on the same peripheral face B12 as the chamber or chambers P1.

Whatever the methods, advantageously, the aim is to produce three main chambers P1w, P1h and P1o which form parallel cavities (see in particular FIG. 3), which open onto at least one side, that is, onto a peripheral face, and even onto both sides, which favours an easy assembly of the fluid management elements. Inside the parallel cavities, elements will be fitted and ducts and elements will be connected to construct the three management systems respectively for a hydrogen circuit, a circuit for the coolant and an oxygen circuit.

Figure 5:
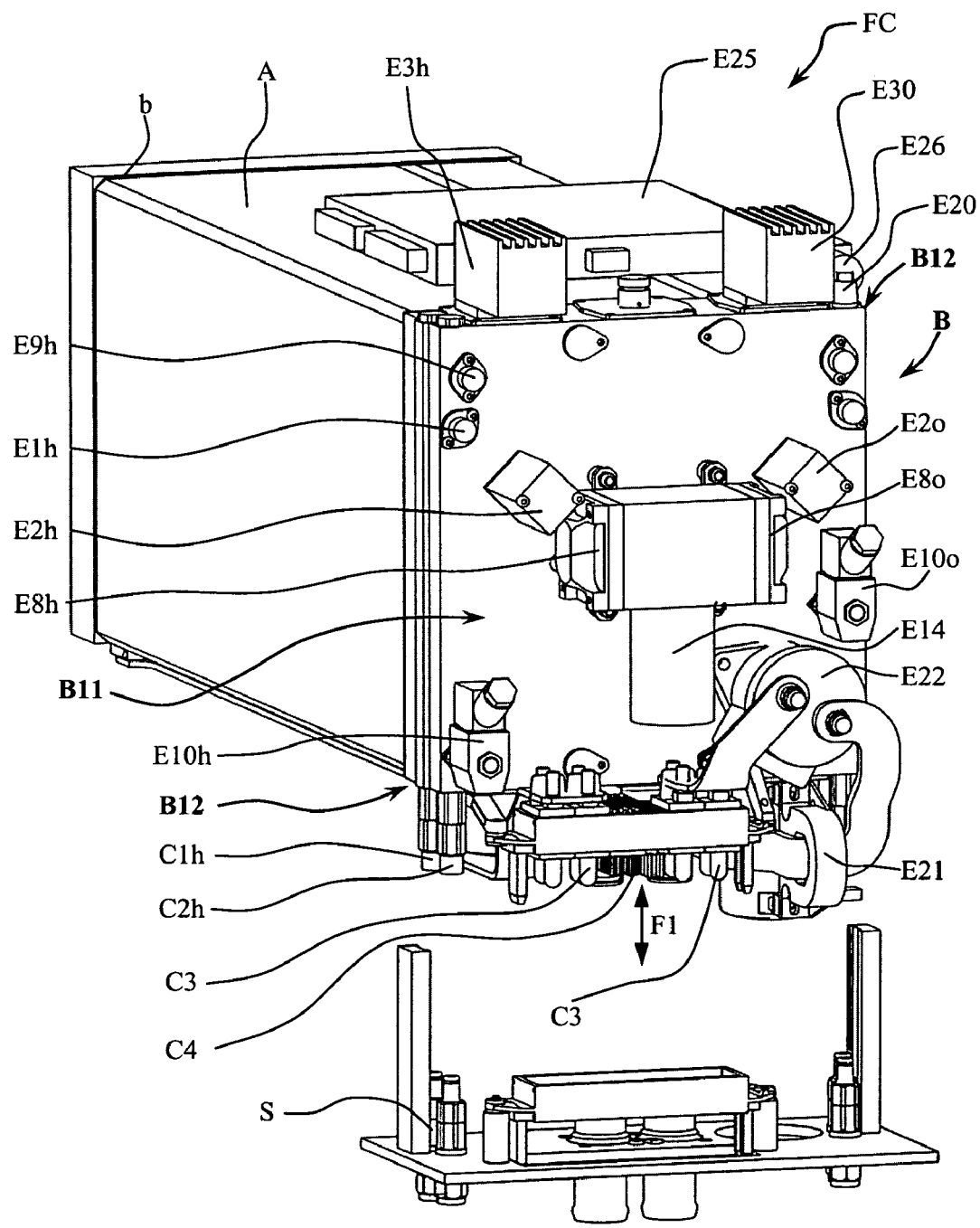
FIG. 5 is a perspective view showing the fuel cell close to a receiving support associated with a vehicle, but not connected to the latter.
Figure 6:
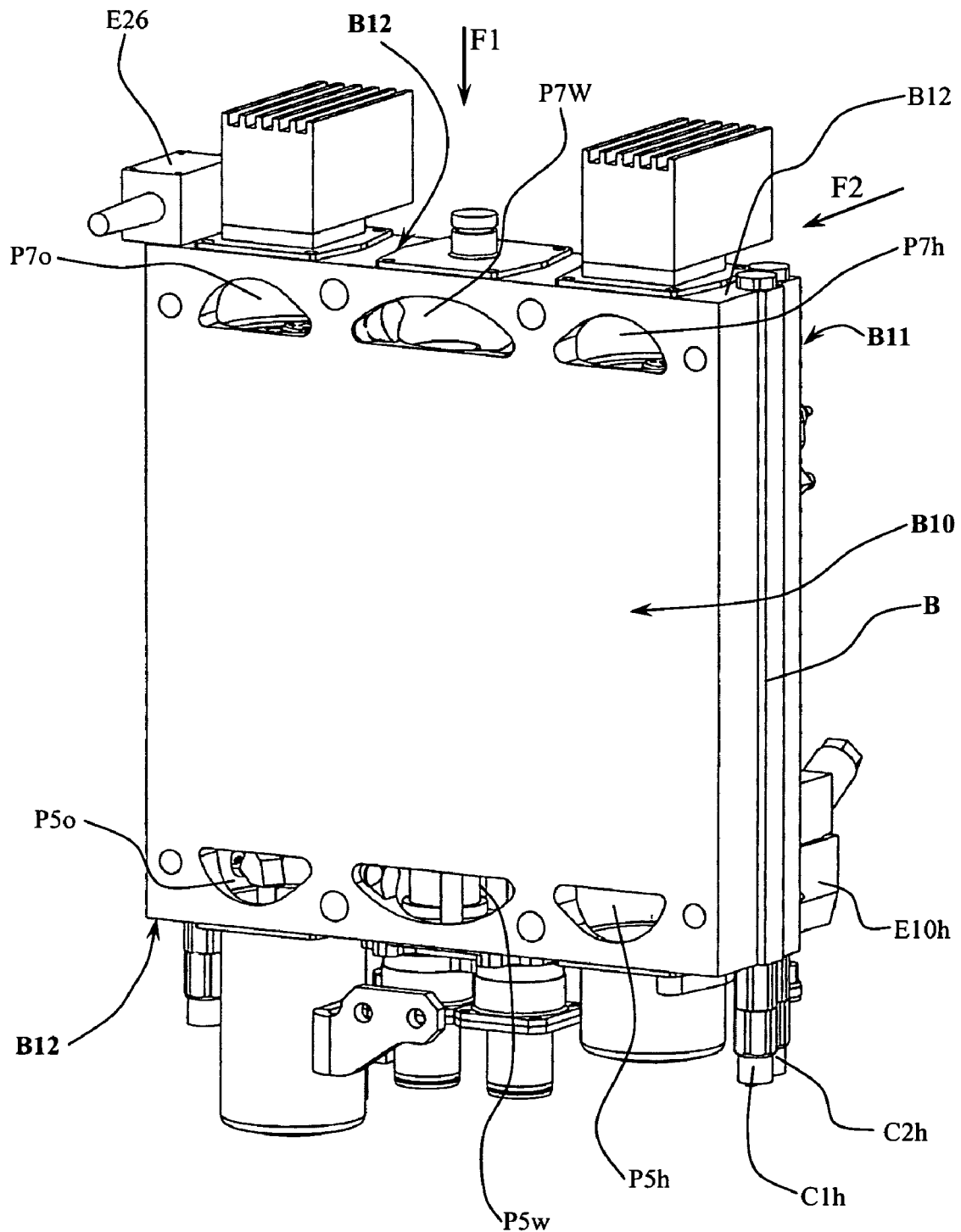
FIG. 6 is another perspective view of the endplate of FIG. 5, showing the side designed to be in contact with the stack of individual cells.

FIG. 6 shows the internal face B10 of the endplate B according to the invention, designed to bear against said stack. This internal face has two orifices P7h and P5h designed to feed a hydrogen circuit passing through the stack A of individual electrochemical cells, two orifices P7o and P5o designed to feed an oxygen circuit and two orifices P7w and P5w designed to feed a coolant circuit. The whole of the external face B11 and of the peripheral face or faces B12 are free of any contact with the stack A of individual electrochemical cells. This makes it possible to mount on these faces a number of the elements needed to construct the fluid management systems, as can be seen in the same FIG. 6 and particularly in FIG. 5.

Figure 7A:
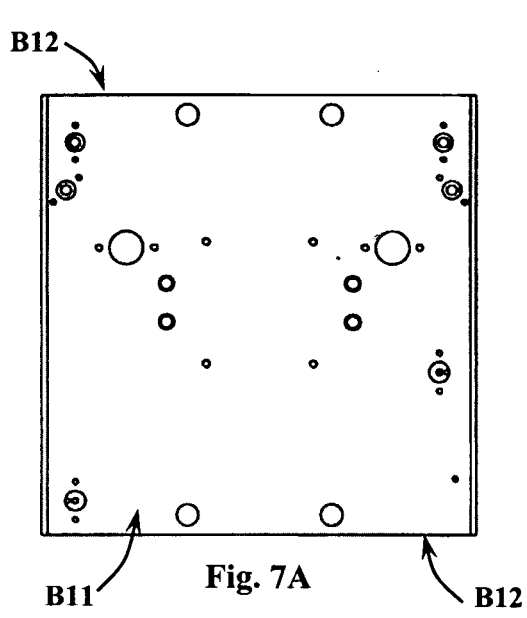
FIGS. 7A, 7B, 7C and 7D show a structural block enabling the endplate of FIG. 6 to be produced.
Figure 7B:
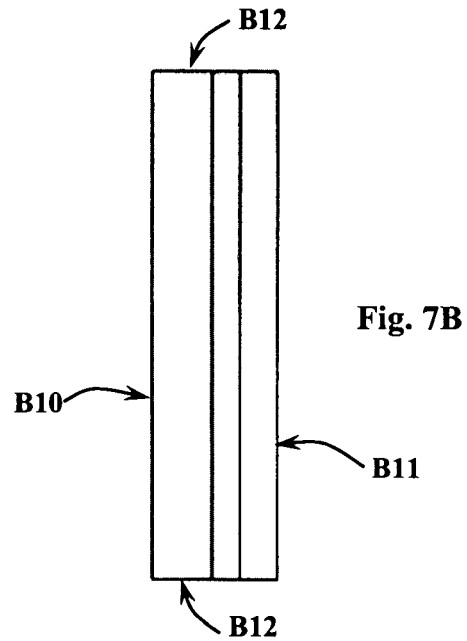
Figure 7C:
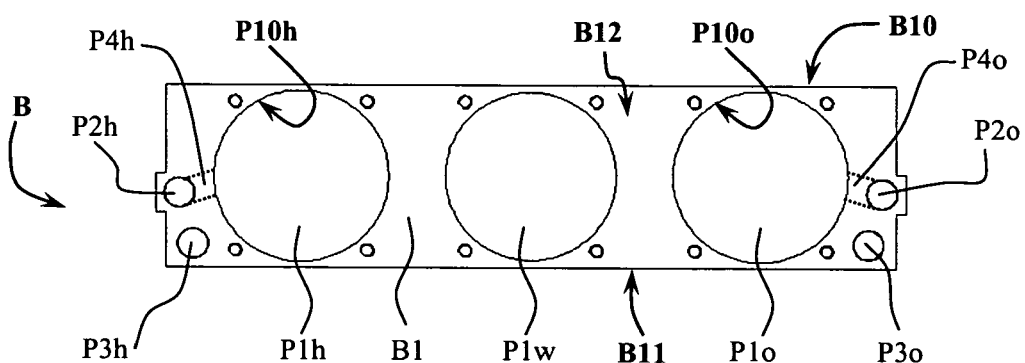
Figure 7D:
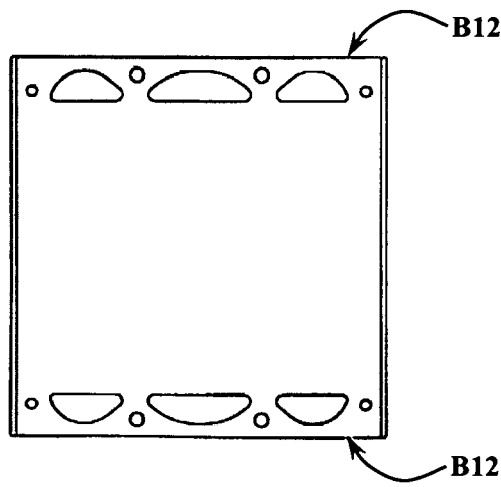
Figure 8:
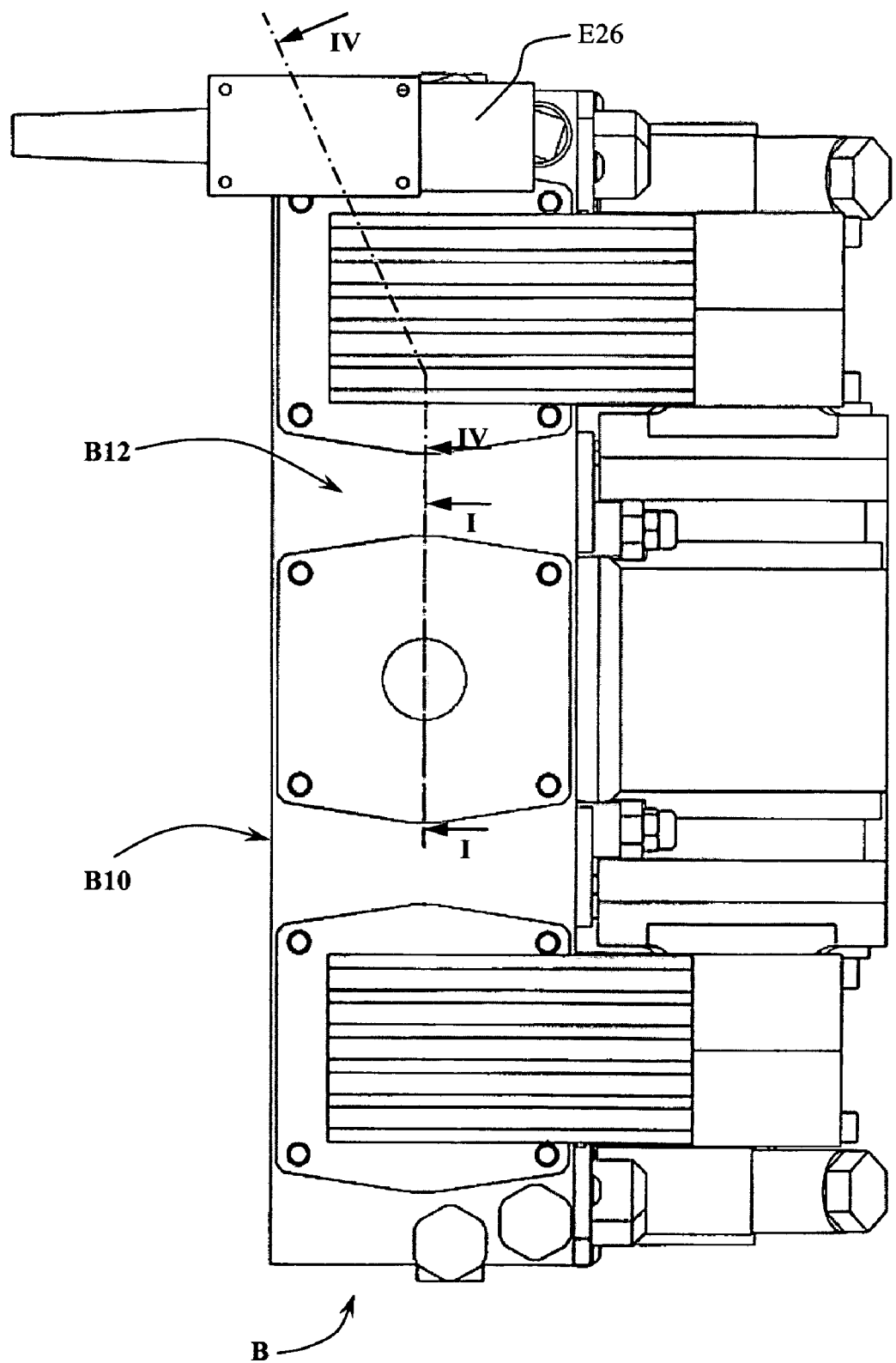
FIG. 8 is a plan view of the endplate of FIG. 5.

FIG. 7C shows that the first chamber P1 is provided between the internal face B10 and the external face B11, in the thickness of the structural block B1. It is elongated in the direction parallel to the internal face B10 and is delimited laterally by a wall P10, in this case cylindrical. The cylindrical nature of the chamber is of course only a mechanical production convenience; the chamber could be of parallelepipedal appearance, still being elongated substantially parallel to the internal face B10.

Figure 11:
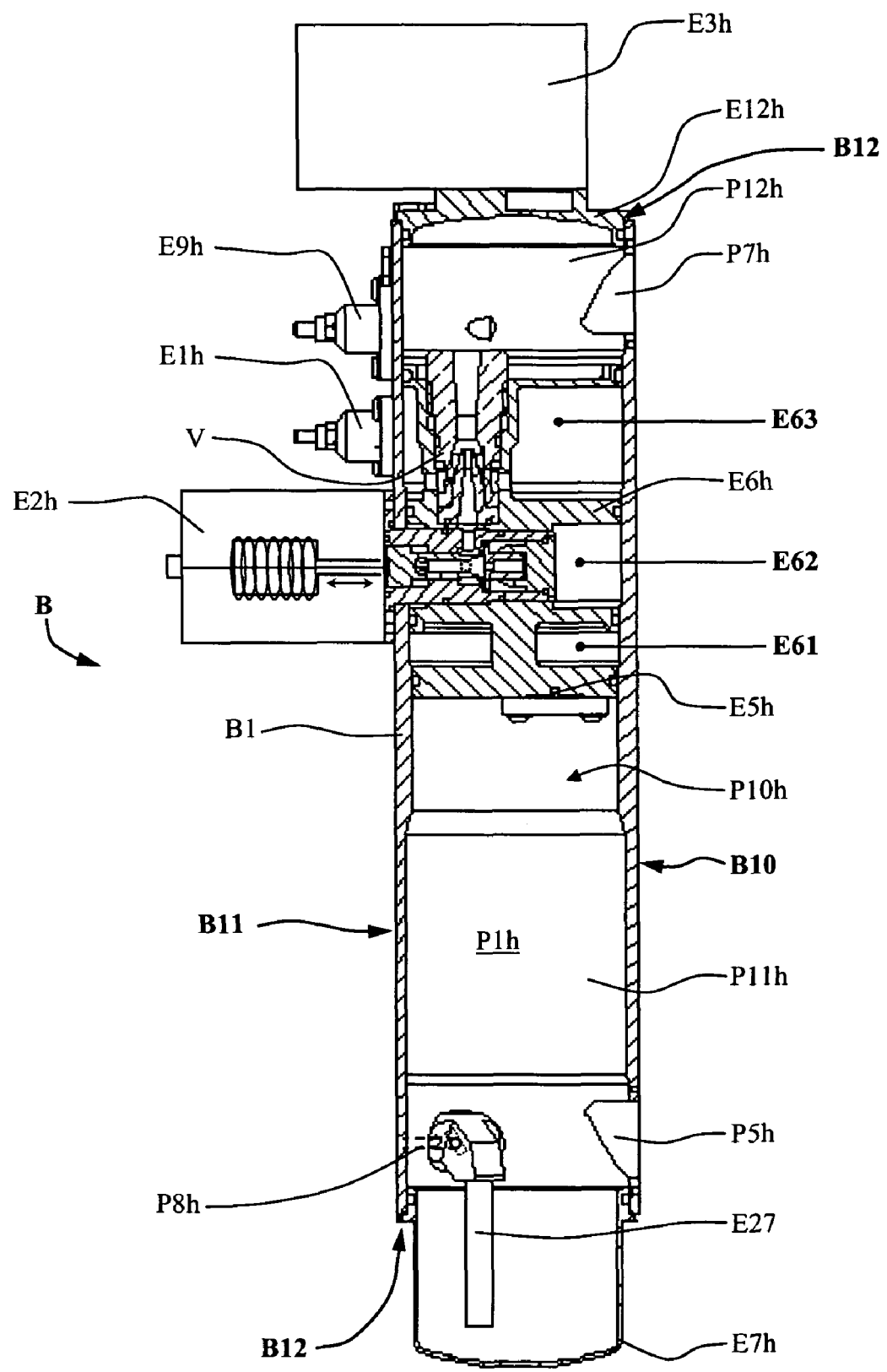
FIG. 11 is a cross section along III-III in FIG. 10.

Preferably, to facilitate assembly, the chamber P1 passes through the entire structural block B1 and opens onto opposite peripheral faces B12, the chamber P1 being delimited by two closure-forming devices each fitted on one of the peripheral faces B12, such as, for example, a closure E12h and a receptacle E7h (see FIG. 11).

FIG. 5 shows a fuel cell FC according to the invention and the support S on which it is mounted by a relative approach movement (see double-arrow F1), which enables the various fluid connections (electrical, gas and coolant connections) to be established and the cell to be positioned mechanically at the same time.

The details of the various fluid circuits integrated in the endplate B are as follows.

Figure 9:
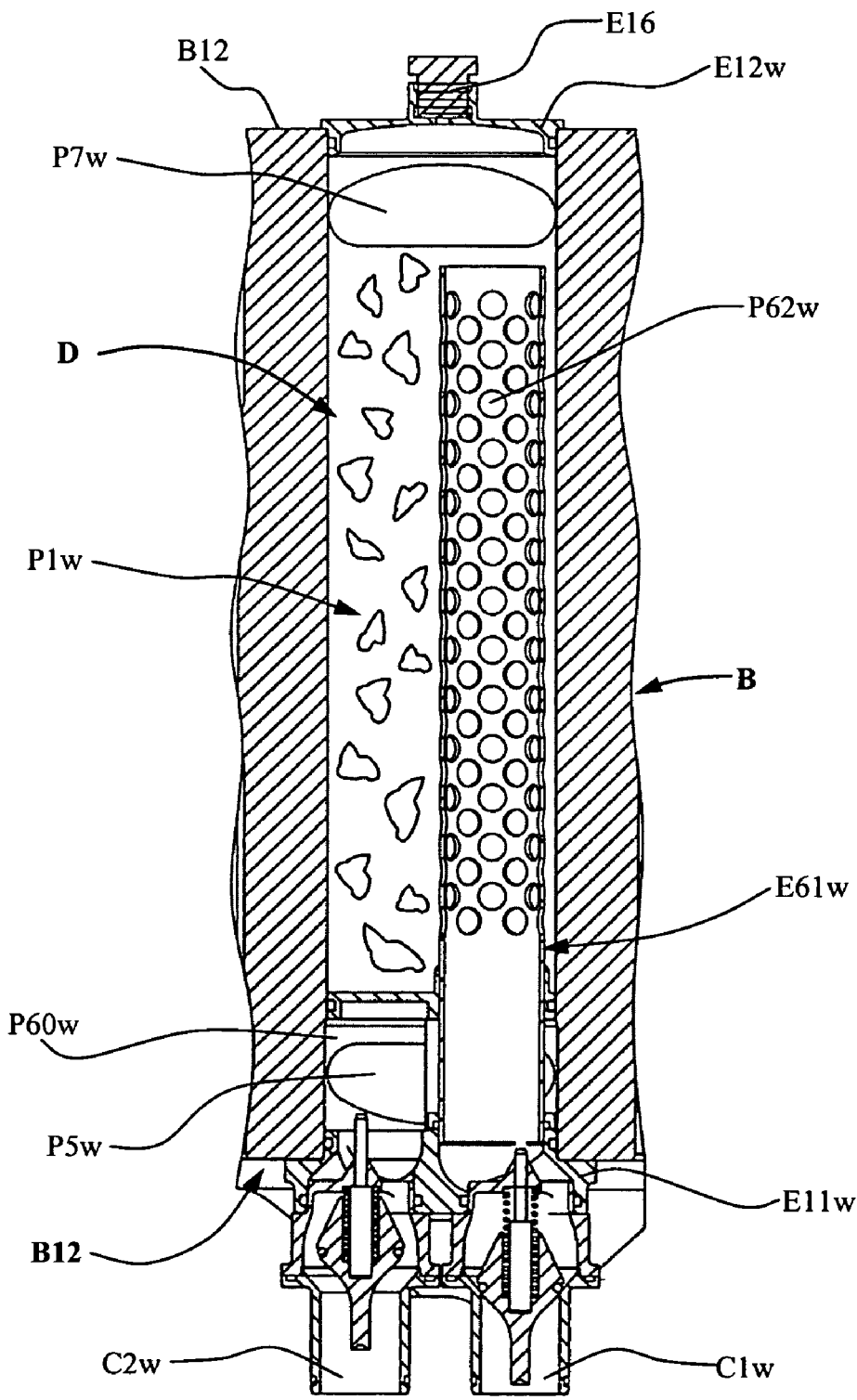
FIG. 9 is a cross-section along I-I in FIG. 8.

Cooling Water Circuit (See in Particular FIG. 9)

The chamber P1w is delimited in its top part by a closure E12w fitted on a peripheral face B12. A purge valve E16 is fitted on the closure E12w to let out any gas present in the water. An insert E11w is fitted at the bottom end of the chamber P1w. This insert E11w receives two self-sealing couplings C1w and C2w and it forms a cover that closes off the chamber P1w at one of its ends.

The insert E11w comprises an internal chamber P60w communicating with the orifice P5w and with the coupling C2w. It also receives a tube E61w, the wall of which is solid over the height of the internal chamber P60w and includes a plurality of orifices P62w over a part that extends roughly all along the length of the chamber P1w. The volume of the chamber P1w outside the tube E61w can hold crystals of an appropriate chemical composition to form the deionizer D. The chamber P1w forms a feeder which communicates on one side with the orifice P7w and on the other side with the coupling C1w.

The water enters the endplate B through the connector C1w in FIG. 9, passes through a deionizer D and enters the cell through the orifice P7w. Since the top end of the tube E61w is not blocked, not all of the flow passes through the crystals. This makes it possible to limit the head loss. Experimental observation shows that the deionization is sufficient. As a variant, an arrangement resembling a filter can be adopted, which would compel the entire flow to pass through the deionizer. After passing into the bipolar plates, the water returns to the endplate B through the orifice P5w, and leaves the fluid management system via the connector C2w in FIG. 9. Note that the connector C2w is shown open while the connector C1w is shown closed in order to clearly show their operation but, in practice, these connectors are both open together when the fuel cell is mounted to operate, for example, in a vehicle, or they are both closed together when the fuel cell is removed.

Note also, and this is an advantage of the present invention, that, during its passage through the system, the water keeps the whole of the system plate B at the correct temperature.

Figure 4:
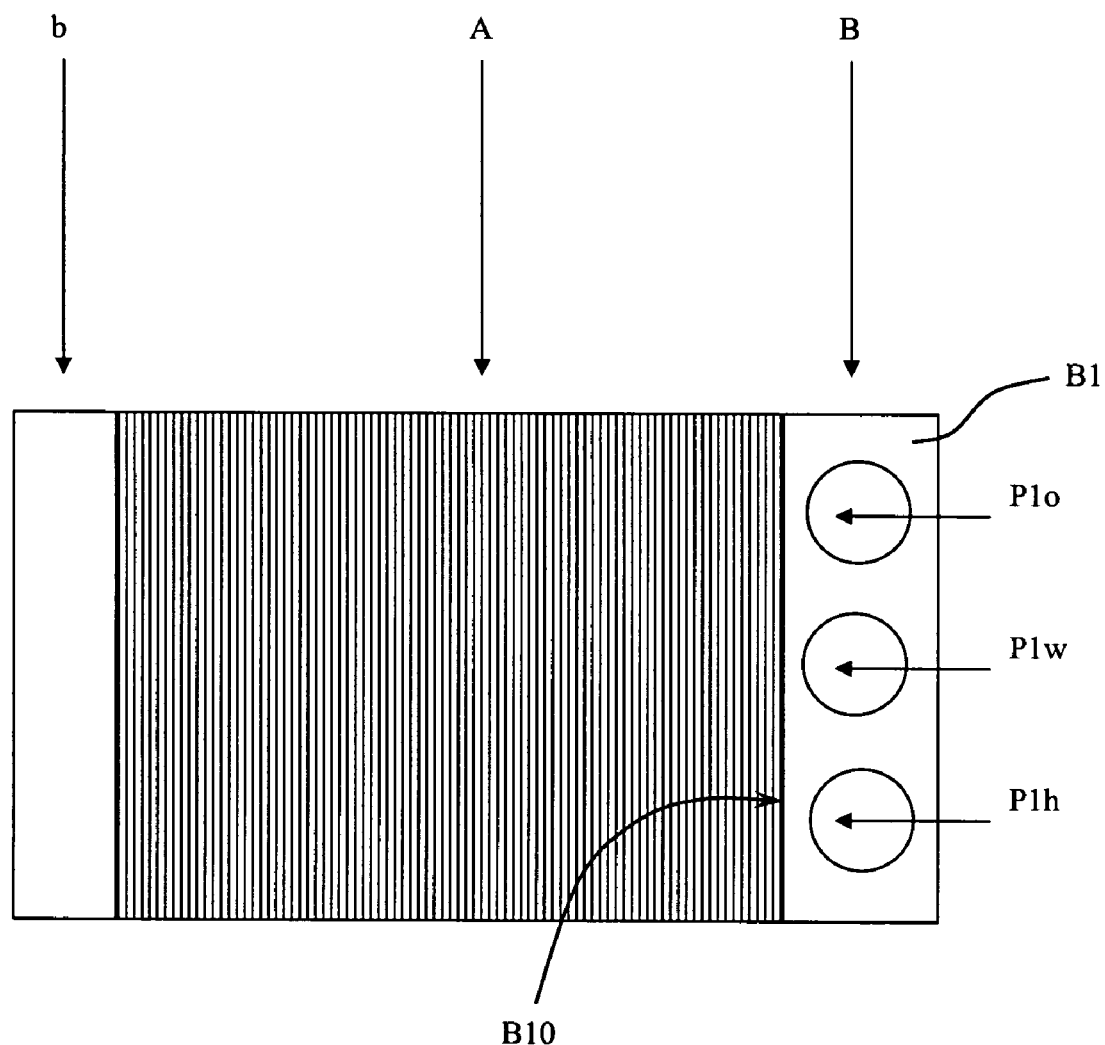
FIG. 4 is a plan view of the fuel cell of FIG. 2.

Preferably, the endplate according to the invention comprises, in addition to the chamber P1$w$ forming the coolant feeder, a first chamber (P1$h$) and a second chamber (P1$o$) enabling an arrangement of the hydrogen and oxygen management systems as explained below (see for example FIG. 4).

Hydrogen Gas Circuit (See Mainly FIG. 11)

The chamber P1$h$ extends between the orifices P5$h$ and P7$h$ on the internal face B10 of the structural block B1. The chamber P1$h$ is delimited at the top by a closure E12$h$ fitted on an external face B12. A pressure sensor E3$h$ is fitted on the closure E12$h$. The chamber P1$h$ is delimited in its bottom part by a water collection receptacle E7$h$, fitted to the bottom portion of the peripheral face B12 of the structural block B1.

A connector C1$h$ is fitted to the bottom part of the peripheral face B12 (FIG. 5). This connector C1$h$ is fitted over a hole forming said feed duct P2$h$ feeding the cell with hydrogen gas (see also FIG. 7C—plan view of the structural block B1—to identify the various perforations, including the feed duct P2$h$). The feed duct P2$h$ is connected to another perforation forming an auxiliary duct P3$h$ which opens onto a purging orifice, said auxiliary duct being essentially parallel to the feed duct, and connected to the latter at least by a pressure relief valve E1$h$ (FIG. 5). The auxiliary duct P3$h$ is then connected to the outside of the vehicle via the connector C2$h$ (FIG. 5, FIG. 6). A purging dip tube E27 (FIG. 11) is fitted in the water receptacle E7$h$ and is connected to a purging solenoid valve E10$h$ (FIGS. 5 and 6) which communicates with the auxiliary duct P3$h$, via a purging perforation P8$h$ perpendicular to the auxiliary duct P3$h$.

The feed duct P2$h$ ends at the wall P10$h$ of the chamber P1$h$ (FIG. 13) via a passage P4$h$ formed perpendicularly to the feed duct P2$h$ (see FIG. 7C). A recirculation body E6$h$ (FIG. 11) is positioned inside the chamber P1$h$, hermetically on the wall P10$h$ and at the level of the passage P4$h$. The body E6$h$ separates the chamber P1$h$ into a gas feed part P12$h$ ending at the orifice P7$h$ and a gas recirculation part P11$h$ ending at the orifice P5$h$.

Figure 10:
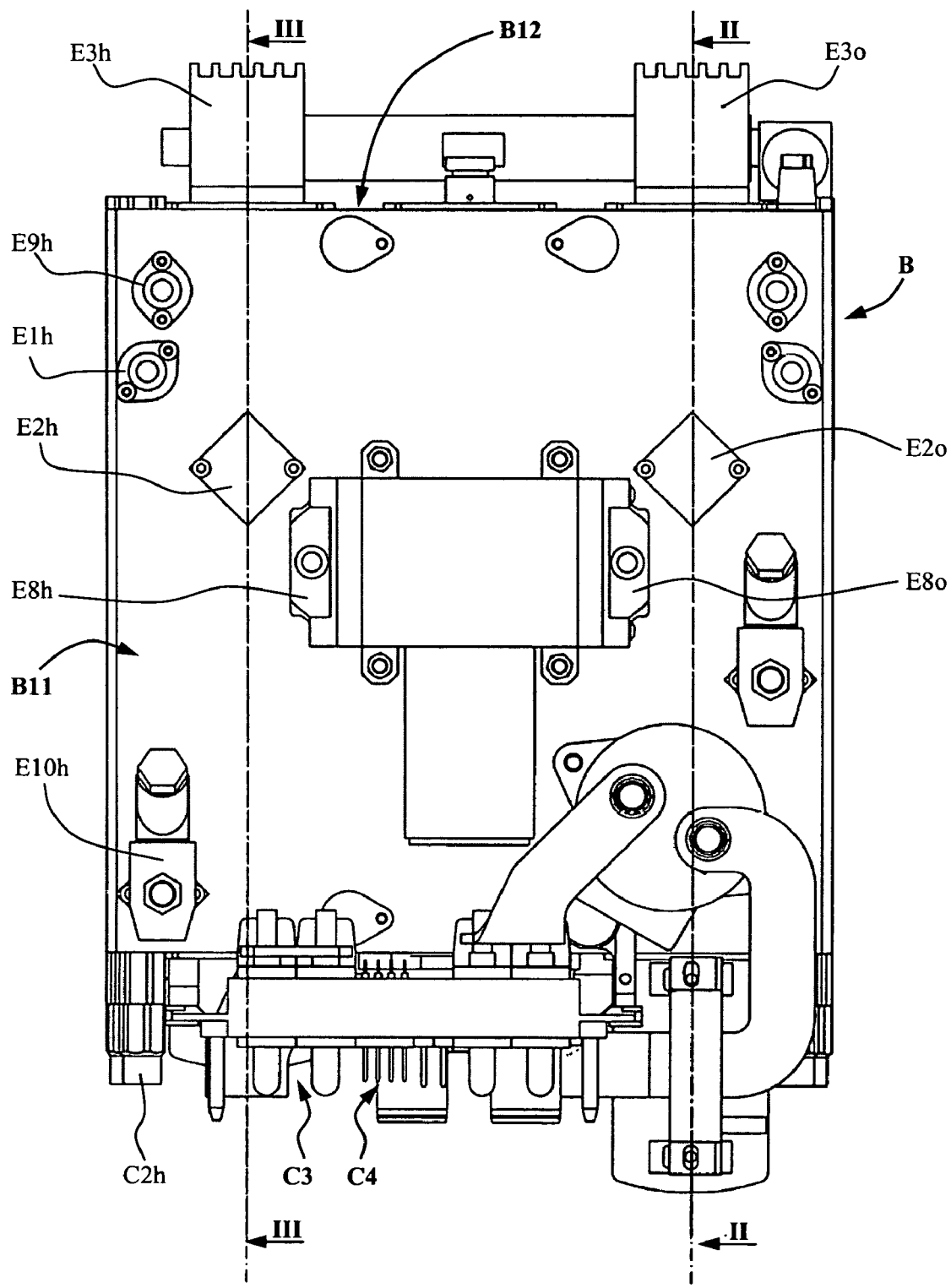
FIG. 10 is a front view of the endplate of FIG. 5.
Figure 13:
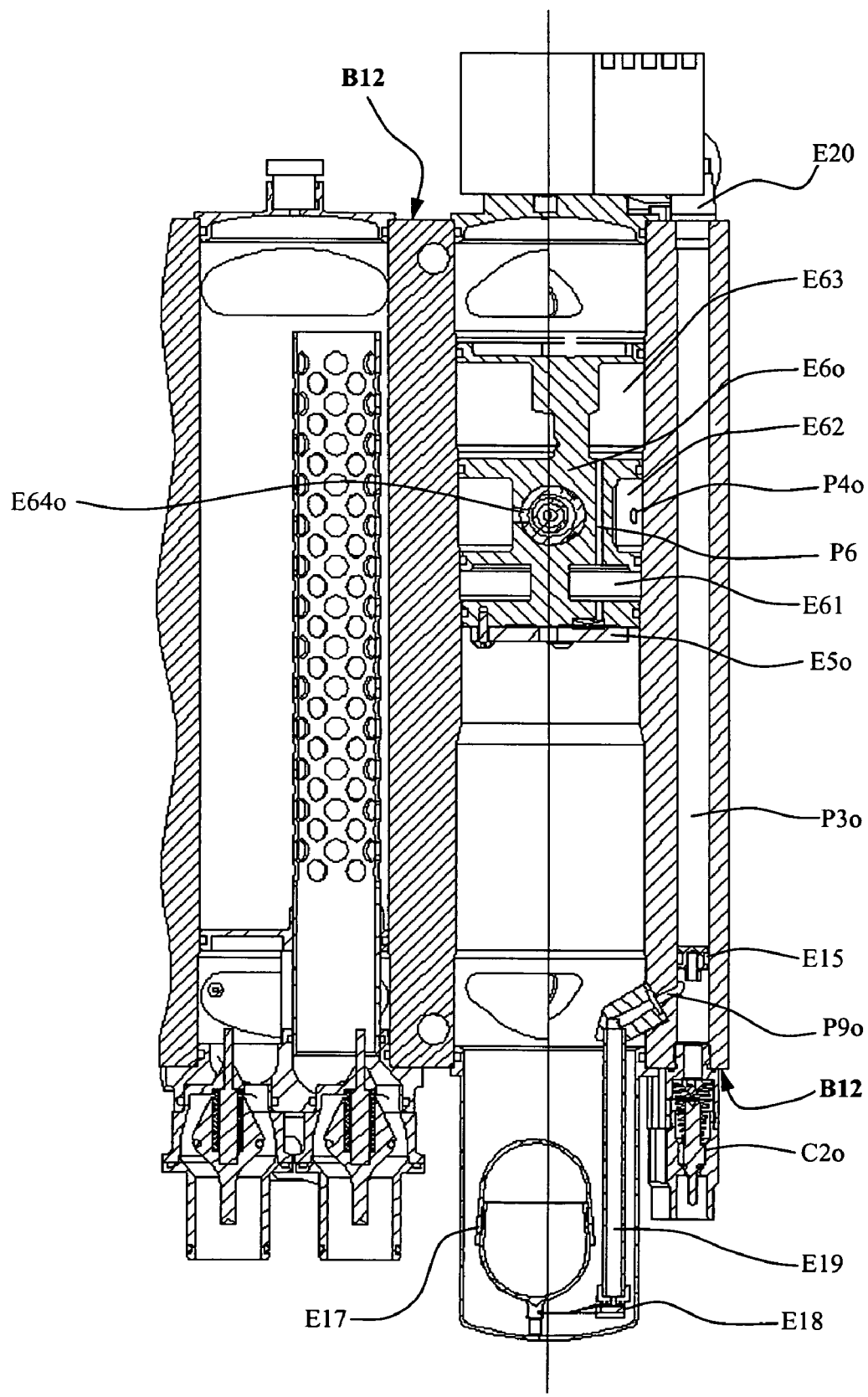
FIG. 13 is a cross section along IV-IV in FIG. 8.

For a better understanding of the construction of the recirculation body E6, the reader is invited to refer to FIG. 13 which shows, in cross section through a plane perpendicular to the plane of FIG. 11, the recirculation body E6$o$ used in the chamber P1$o$ of the oxygen circuit. The bodies E6$h$ and E6$o$ and the devices and means that they contain are identical. Each recirculation body E6 comprises a first cavity E61, a second cavity E62 and a third cavity E63. The second cavity E62 communicates with the passage P4 (see P4$o$ in FIG. 13, the passage P4$h$ for hydrogen not being visible in FIG. 11) on the one hand, and with a hole E64 (see E64$o$ in FIG. 13, the equivalent for the hydrogen circuit not being visible in FIG. 11) communicating with the pressure regulating solenoid valve E2$h$ (FIGS. 5, 10 and 11). FIG. 7C shows the passages P4$h$ and P4$o$, without showing other constructional details of the same type to avoid cluttering up the figure.

A one-way valve E5 is fitted on the recirculation body E6 between the part P11 (recirculation) of the chamber P1 and the first cavity E61. A perforation P6 provides communication between the first cavity E61 and the third cavity E63. In addition, a recirculation pump E8$h$ (FIGS. 5 and 10) is fitted on the structural block B1 with its suction side communicating with the part P11 of the chamber P1$h$ and its discharge side communicating with the first cavity E61. Purely for illustration purposes, a membrane pump can be used both on the oxygen side and on the hydrogen side. Advantageously, the two membrane pumps E8$h$ and E8$o$ are driven simultaneously by a single electric motor E14.

The solenoid valve E2 communicates (towards the top in FIGS. 11 and 13, i.e. downstream in relation to the gas circulation) with a void ending at a converging-diverging section forming a Venturi device V. The cavity E63 communicates with the area outside the converging section.

The hydrogen gas enters via the connector C1$h$ and passes through the feed duct P2$h$ of the hydrogen gas cell, where it is heated by contact with the endplate kept at the operating temperature of the fuel cell. The gas is routed by the feed duct P2$h$ to the recirculation body E6$h$. The gas arrives (at a pressure regulated by the valve E2$h$) in the chamber P12$h$. A pressure set point is fixed for the top part P12$h$ of the chamber P1$h$. This is in fact the pressure that is desirable at the inlet of the stack A of individual cells.

The recirculated gas consists of the excess of unconsumed gas leaving the cell through the orifice P5$h$ (FIG. 11). On arriving in the part P11$h$ of the chamber P1$h$, any liquid water present in the gas falls by gravity into the receptacle E7$h$. Any water residues are drained out of the system by actuating the solenoid valve E10$h$, for example at regular intervals. The recirculated gas passes through the one-way valve E5$h$ to access the cavity E61, from where it can pass freely into the cavity E63. The Venturi device V forms the means whereby the new gas present in the cavity E62 and the recirculated gas present in the cavity E63 are mixed, and the mixture then passes into the part P12$h$ of the chamber P1$h$ and then to the orifice P7$h$.

At low power, the gas recirculation by Venturi effect is no longer sufficient, and the recirculation pump E8$h$ is actuated. It sucks in the gas in the part P11$h$ of the chamber P1$h$, and discharges it into the cavity E61 of the chamber P1$h$. In these conditions, the one-way valve E5$h$ is closed.

Thus, working from the bottom to the top, several stages can be distinguished in the chamber P1$h$: a first stage below the orifice P5$h$, a second stage between the orifice P5$h$ and the recirculation body, a third stage corresponding to the second cavity E62, a fourth stage corresponding to the third cavity E63 and a fifth stage between the recirculation body and the orifice P7$h$. A pressure sensor E3$h$ (FIG. 5) is fitted on the structural block to record the pressure prevailing in this fifth stage.

A description has just been given of how the management system for the hydrogen feeding a fuel cell can be integrated in an endplate. Preferably, the endplate B comprises a second chamber P1 which allows an arrangement similar to that of the first chamber P1$h$, the gas circuit associated with one (P1$h$) of the chambers being the hydrogen circuit and the gas circuit associated with the second P1$o$ of the chambers being the oxygen circuit (in this case pure oxygen).

Figure 12:
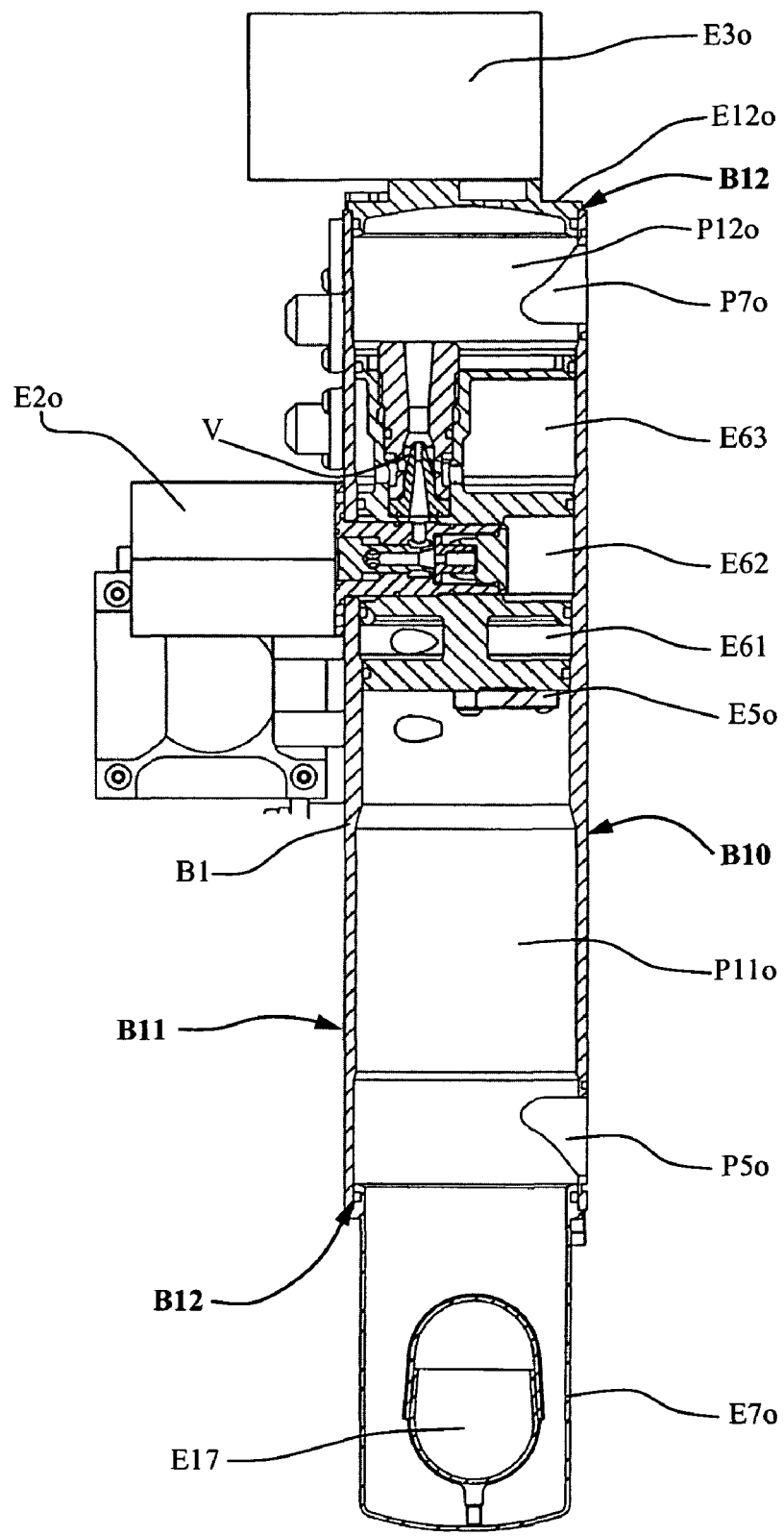
FIG. 12 is a cross section along II-II in FIG. 10.

Oxygen Gas Circuit (See Mainly FIGS. 12 and 13)

The oxygen system is identical to the hydrogen system, apart from the following points:

a. the purges are routed directly to the atmosphere via the solenoid valve E10$o$ (FIG. 5). For this, the top of the perforation P3$o$ is provided with a filter E20 allowing the oxygen to escape freely. A closure E15 separates the top and the bottom of the perforation P3$o$. The bottom of the perforation P3$o$ is used to drain water from the receptacle E7$o$.

b. on the cathode (oxygen) side, there is considerable production of water in liquid form. This water leaving the cell falls by gravity to the bottom of a receptacle E7$o$. A float E17 controls the opening E18 of the inlet of the dip tube E19. This dip tube E19 is connected to the perforation P90 then to the perforation P3o. From there, the water is routed out of the system via the connector C2o.

Electrical Section (See Mainly FIG. 5)

The functions of the system are controlled electrically. For this, it is advantageously possible to install close to or on the endplate according to the invention an electronic module E25 for managing the fuel cell. Preferably, the endplate according to the invention also supports a multiple-pin connector C4 for externally connecting the electronic management module E25. The control unit E25 is placed at the top of the structural block B1. It receives information from the various sensors (non-exhaustive list: pressure sensors E3h and E3o, current measuring sensors E21, hydrogen rate detector E26, etc.). The control unit collects this information and acts on the various units (pressure regulating coils E2h and E2o, purging solenoid valves E10h and E10o, pump motor E14, safety contactor E22). Preferably, the endplate according to the invention also comprises two power electrical connectors C3 designed for the current delivered by the fuel cell. Finally, according to a preferred embodiment, all the electrical connectors and gas or coolant feed couplings are arranged so that they can be coupled together by a single linear relative approach movement between said plate and a support S designed to receive it (see FIG. 5).

Figure 14:
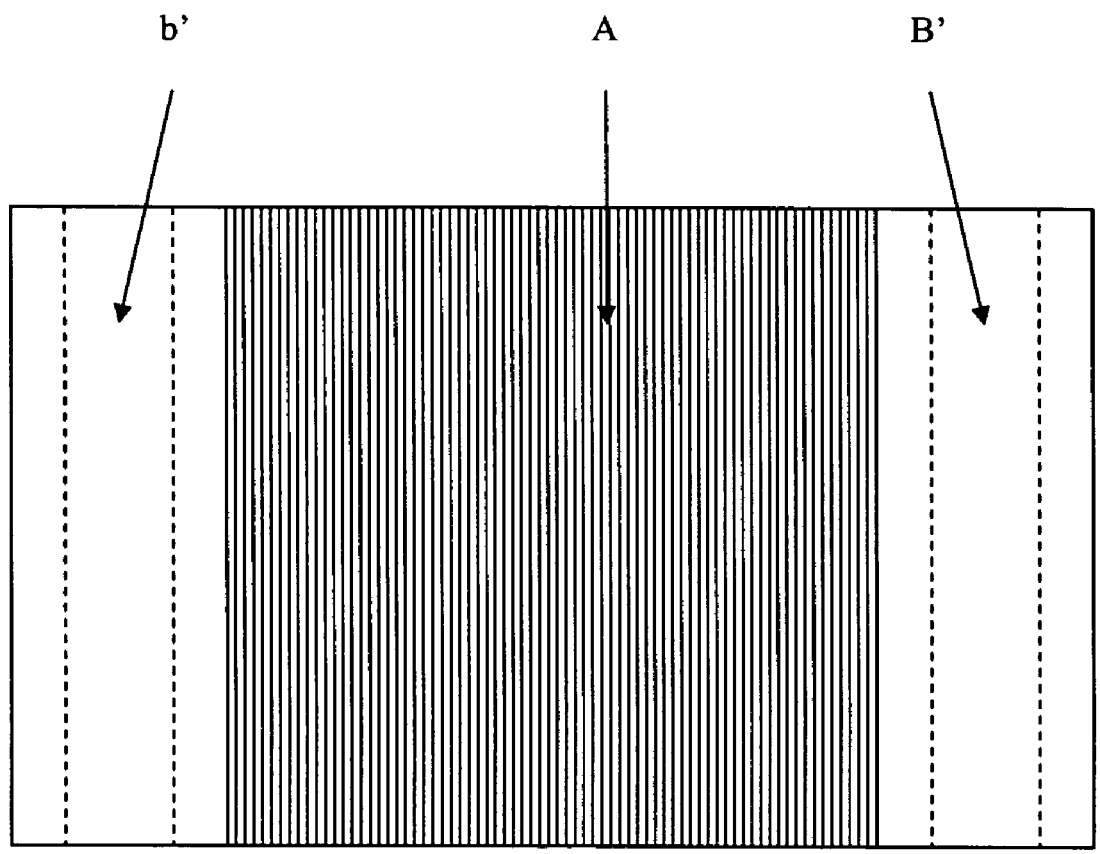
FIGS. 14, 15 and 16 diagrammatically show a variant with a pump for circulating the coolant and a thermostat, integrated in an endplate, the gas management means being integrated in the other endplate.

FIG. 14 illustrates an embodiment variant of the invention in which both the endplate B' and the endplate b' comprise management elements for the fluids used by the cell.

Figure 15:
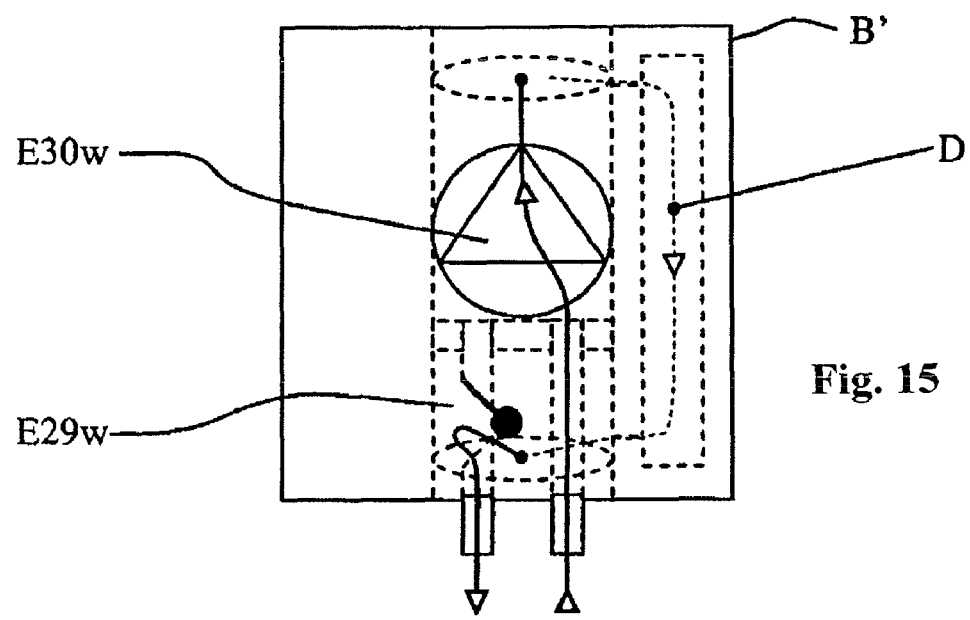
Figure 16:
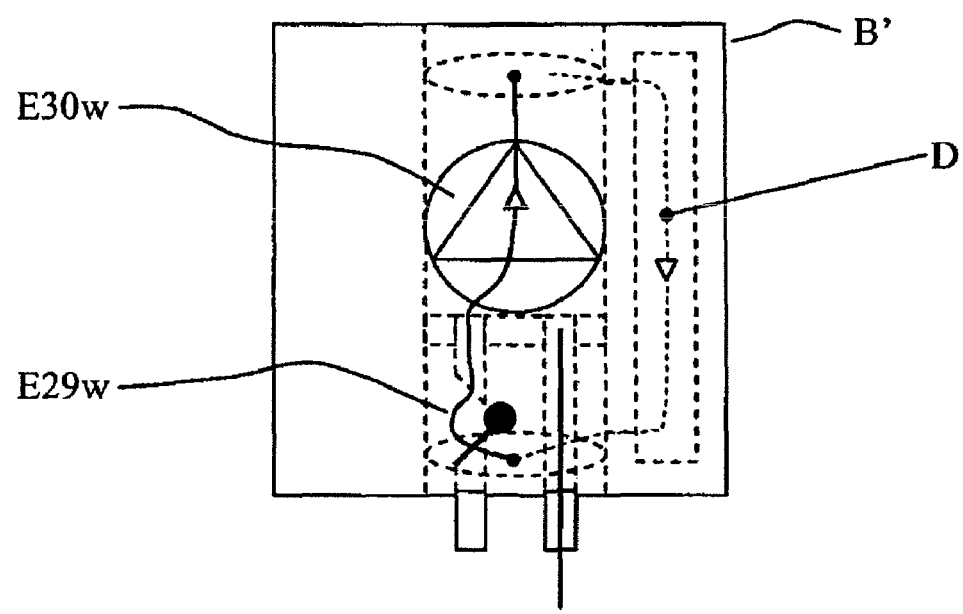

For example, management of the coolant is integrated in one of the endplates and management of the gases is integrated in the other endplate. This can facilitate the installation of a thermostat E29w and a circulation pump E30w for the coolant as illustrated in FIGS. 15 and 16. FIG. 15 diagrammatically illustrates the configuration of the thermostat E29w when the cell has to be cooled. The coolant having passed through the stack A is externally returned to a radiator. FIG. 16 illustrates the configuration of the thermostat E29w when the cell is cold. The coolant that has passed through the stack is directly collected by the pump to circulate in a closed circuit only within the stack in order to make its progressive heating uniform.

In conclusion, we would stress that the benefit of the invention lies particularly in the elimination of many couplings, connections, seals or welds, all of which are sources of unreliability, quite apart from the attendant industrial production costs. The layout of the management system or systems for the fluid or fluids is not as such the subject of the present invention. According to the applicant, the principle of producing a compact system plate explained here seems compatible with many fluid management system schemes, if not all, even if it means that some elements are not integrated in or mounted on such an endplate. The invention also facilitates the replacement of the stack of electrochemical cells while recovering the endplate or plates, for example by providing for a connection by a quick-fit system capable of developing sufficient contact pressure between the stack and the endplate, such as, for example an elbow-lever system. A system plate according to the invention could also be adapted to connect and be inserted between two stacks of individual cells.

The invention claimed is:

1. An endplate for a fuel cell, the endplate comprising a structural block having an internal face designed to bear against a stack of individual cells, with an external face opposite to the internal face and one or more peripheral faces, the internal face having at least two orifices designed to feed a gas circuit located inside the cell, the structural block comprising a first chamber and comprising a feed duct ending at a wall of the chamber:

wherein the first chamber is provided between the internal face and the external face, and is delimited on a side of the internal face and of the external face by a wall of the structural block, the first chamber being elongated roughly parallel to the internal face, the first chamber opens onto a peripheral face, the first chamber being delimited by at least one plug mounted on said peripheral face; and wherein a recirculation body is fitted inside the chamber, positioned at the point where the feed duct ends, the recirculation body being mounted hermetically on the wall of the chamber to separate the chamber into a gas recirculation part terminating at one of the orifices and a feed part terminating at the other orifice, the recirculation body comprising a mixing element for mixing a new gas originating from the feed duct and the gas originating from the recirculation part and enabling the mixture to be directed to the other orifice.

2. The endplate according to claim 1, wherein the chamber passes through the entire structural block and opens onto opposite peripheral faces, the chamber being delimited by two closures each mounted on one of the peripheral faces.

3. The endplate according to claim 1, wherein the feed duct and a discharge duct are provided between the internal face and the external face, are elongated roughly parallel to the internal face, and open onto the same peripheral face as the chamber.

4. The endplate according to claim 1, wherein the chamber is delimited, at its end opposite to the recirculation body, by a water collection receptacle, and comprises a purging dip pipe fitted inside the water receptacle and connected to a purging solenoid valve.

5. The endplate according to claim 1, wherein the chamber is delimited, at its end opposite to the recirculation body, by a water collection receptacle, and comprises a dip pipe to discharge the water produced, the opening of which is controlled by a float.

6. The endplate according to claim 1, comprising an auxiliary duct opening onto a purging orifice, said auxiliary duct being arranged substantially parallel to the feed duct, and connected to the latter at least via a pressure relief valve.

7. The endplate according to claim 1, comprising a second chamber enabling an arrangement similar to the arrangement of the first chamber, the gas circuit associated with one of the chambers being the hydrogen gas circuit and the gas circuit associated with the other of the chambers being the air or oxygen circuit.

8. An endplate for fuel cell, the endplate comprising a structural block having an internal face designed to bear against a stack of individual cells, the internal face having at least two orifices designed to be linked to a coolant circuit located inside the fuel cell, wherein the structural block comprises a chamber forming a feeder of coolant, enabling the following arrangement:

the feeder-forming chamber is delimited by one or more walls of the structural block;

the feeder-forming chamber extends between said two orifices; and an insert is positioned and fitted inside the feeder-forming chamber, hermetically against the wall of the chamber, and comprises means to enable the circulation of the coolant selectively to said two orifices.

9. The endplate according to claim 8, wherein the chamber is delimited by at least one closure fitted on the peripheral face.

10. The endplate according to claim 8, wherein the insert forms a closure blocking the chamber at one of its ends.

11. The endplate according to claim 8, wherein the insert comprises an internal chamber which communicates with the orifice and with a coupling.

12. The endplate according to claim 11, wherein a tube whose wall includes multiple orifices is fitted on the insert and extends roughly over the full length of said feeder-forming chamber.

13. The endplate according to claim 1, also comprising two electrical power connectors designed for the current delivered by the fuel cell.

14. The endplate according to claim 13, wherein all the electrical connectors and gas or coolant feed couplings are arranged so that said connectors and couplings can be coupled simply by a linear relative approach movement between said plate and a support designed to receive it.

15. A fuel cell comprising a stack of bipolar plates and ion exchange membranes arranged alternately, the stack being clamped between two endplates, one of the endplates being an endplate according to claim 1.

16. The fuel cell according to claim 15, wherein elements for controlling certain operating parameters are fitted on or integrated in one of the endplates.

17. The fuel cell according to claim 15, wherein elements for recycling the gases not consumed by the cell are fitted on or integrated in one of the endplates.

18. The fuel cell according to claim 15, wherein elements for eliminating the water produced by the cell are fitted on or integrated in one of the endplates.

19. The fuel cell according to claim 15, wherein elements for distributing a coolant are fitted on or integrated in one of the endplates.

20. The endplate according to claim 8, the structural block having an external face opposite to the internal face and one or more peripheral faces, the internal face having at least two orifices designed to feed a gas circuit located inside the cell, the structural block comprising in addition to the coolant feeder-forming chamber, a first chamber and comprising a feed duct ending at a wall of the chamber;
wherein the first chamber is provided between the internal face and the external face, and is delimited on the side of the internal face and of the external face by a wall of the structural block, the chamber being elongated roughly parallel to the internal face, the chamber opens onto a peripheral face, the chamber being delimited by at least one plug mounted on said peripheral face; and
wherein a recirculation body is fitted inside the chamber, positioned at the point where the feed duct ends, the recirculation body being mounted hermetically on the wall of the chamber to separate the chamber into a gas recirculation part terminating at one of the orifices and a feed part terminating at the other orifice, the recirculation body comprising a mixing element for mixing the new gas originating from the feed duct and the gas originating from the recirculation part and enabling the mixture to be directed to the other orifice.

21. The endplate according to claim 20, wherein the chamber passes through the entire structural block and opens onto opposite peripheral faces, the chamber being delimited by two closures each mounted on one of the peripheral faces.

22. The endplate according to claim 20, wherein all the feed and discharge ducts are provided between the internal face and the external face, are elongated roughly parallel to the internal face, and open onto the same peripheral face as the chamber.

23. The endplate according to claim 20, wherein the chamber is delimited, at its end opposite to the recirculation body, by a water collection receptacle, and comprises a purging dip pipe fitted inside the water receptacle and connected to a purging solenoid valve.

24. The endplate according to claim 20, wherein the chamber is delimited, at its end opposite to the recirculation body, by a water collection receptacle, and comprises a dip pipe to discharge the water produced, the opening of which is controlled by a float.

25. The endplate according to claim 20, comprising an auxiliary duct opening onto a purging orifice, said auxiliary duct being arranged substantially parallel to the feed duct, and connected to the latter at least via a pressure relief valve.

26. The endplate according to claim 20, comprising a second chamber enabling an arrangement similar to the arrangement of the first chamber, the gas circuit associated with one of the chambers being the hydrogen gas circuit and the gas circuit associated with the other of the chambers being the air or oxygen circuit.

* * * * *